United States Patent [19]
Snow

[11] Patent Number: 5,494,253
[45] Date of Patent: Feb. 27, 1996

[54] COOKIE SHEET DEVICE

[76] Inventor: Bruce A. Snow, 26A Cross St., Salem, N.H. 03079

[21] Appl. No.: 138,996

[22] Filed: Oct. 21, 1993

[51] Int. Cl.⁶ ........................................... A21B 3/15
[52] U.S. Cl. ...................... 249/102; 99/440; 211/194; 249/120; 249/126; 249/139; 249/DIG. 1
[58] Field of Search ................... 249/102, 119, 249/120, 126, 139, DIG. 1; 211/188, 194; 99/426, 440, 442, 441, 422; D7/354, 356, 357; D15/90

[56] References Cited

U.S. PATENT DOCUMENTS

| | | | |
|---|---|---|---|
| 1,168,511 | 1/1916 | Kefauver | 249/120 |
| 1,375,771 | 4/1921 | Bradt | 249/126 |
| 1,464,792 | 8/1923 | Wierth | 249/120 |
| 1,587,288 | 6/1926 | Dooly | 249/120 |
| 1,817,339 | 8/1931 | Barnes | 249/126 |
| 2,006,938 | 7/1935 | Birkenhauer | 249/120 |
| 2,198,106 | 4/1940 | Chandonia | 249/126 |
| 2,469,067 | 5/1949 | Follin | 249/126 |
| 3,310,276 | 3/1967 | Bonney | 249/120 |
| 3,661,353 | 5/1972 | Newsteder | 249/120 |
| 4,366,941 | 1/1983 | Harris | 249/126 |
| 4,703,702 | 11/1987 | Speicher | 211/194 |
| 4,836,393 | 6/1989 | Maye | 211/188 |
| 4,998,023 | 3/1991 | Kitts | 211/188 |

FOREIGN PATENT DOCUMENTS 972719  2/1951  France ................................ 249/120

*Primary Examiner*—Jay H. Woo
*Assistant Examiner*—Joseph Leyson

[57] ABSTRACT

A cookie sheet device formed of multiple, closely stacked, heat-conductive, substantially rigid, flat sheets is disclosed, each sheet having a plurality of openings therein adapted to receive removable cookie molds. The sheets are stacked in superposed fashion utilizing a short distance above the next lower sheet sufficient to allow cookies in the lower sheet to rise in normal fashion yet to leave very little excess distance between the top of each cookie and the bottom of the molds inset into the upper sheet. When inserted into a baking oven, the temperature of each set of molds is thus kept substantially the same, allowing for even baking of cookies in each sheet. While more than two sheets may be used, (generally in commercial size batches) the preferred device utilizes two sheets only. The openings in the sheets may be circular or square or otherwise shaped dependent upon the shape of the outside portion of the molds being used. Likewise the molds themselves may be circular or decoratively shaped to form the cookies as desired.

8 Claims, 4 Drawing Sheets

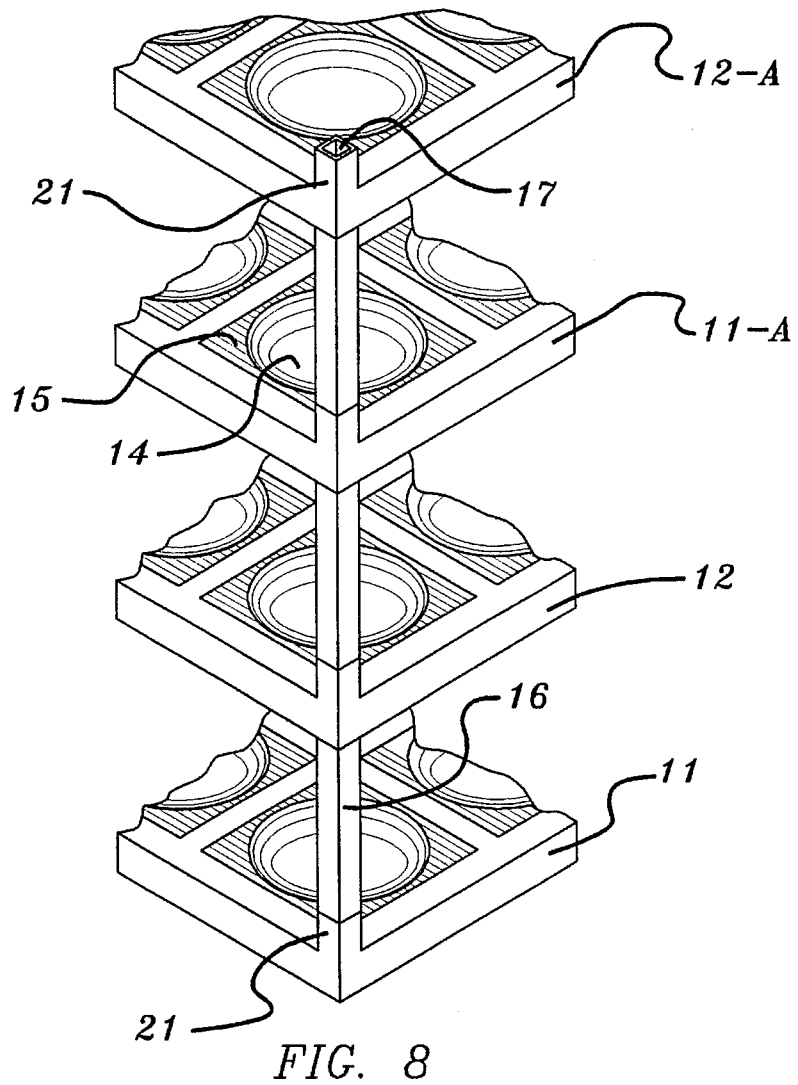
FIG. 8
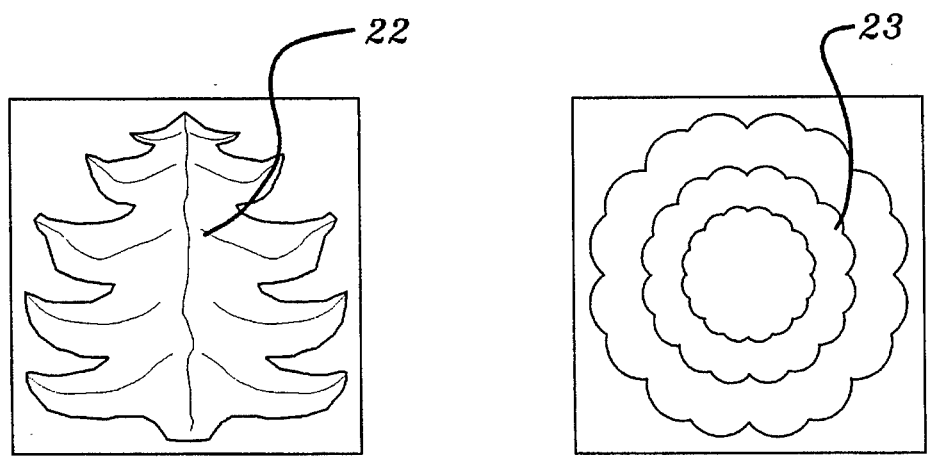
FIG. 9
FIG. 10

5,494,253

COOKIE SHEET DEVICE

BACKGROUND OF THE INVENTION

1. Field of the Invention

The present invention relates to cookie sheets and more particularly pertains to such sheets which may be utilized for baking a multiplicity of cookies at one time.

2. Description of the Prior Art

The use of cookie sheets is known in the prior art. More specifically, sheets heretofore devised and utilized for the purpose of baking cookies are known to consist basically of familiar, expected and obvious structural configurations, notwithstanding the myriad of designs encompassed by the crowded prior art which have been developed for the fulfillment of countless objectives and requirements and to be useful generally for only small batches of cookies. Typical sheets are shown or referred to in U.S. Letters Pat. Nos. 4,455,925; 4,463,029; 5,062,356; 4,066,817; and for a multiplicity of units, a conveyor type arrangement in U.S. Letters Pat. No. 5,016,528.

In this respect, the cookie sheet device according to the present invention substantially departs from the conventional concepts and designs of the prior art, and in so doing provides an apparatus primarily developed for the purpose of expediting the baking of a relatively large number of cookies at the same time.

Therefore, it can be appreciated that there exists a continuing need for new and improved cookie sheets which can be used for making large batches of cookies. In this regard, the present invention substantially fulfills this need.

SUMMARY OF THE INVENTION

In view of the foregoing disadvantages inherent in the known types of cookie sheets now present in the prior art, the present invention provides an improved cookie sheet device construction wherein the same can be utilized for making substantially larger than usual batches of cookies at one time. As such, the general purpose of the present invention, which will be described subsequently in greater detail, is to provide a new and improved cookie sheet device which has all the advantages of the prior art cookie sheets and none of the disadvantages.

To attain this, the present invention essentially comprises a cookie sheet device formed of multiple, closely stacked, heat-conductive, substantially rigid, flat sheets, each sheet having a plurality of openings therein adapted to receive removable cookie molds. The sheets are stacked in superposed fashion utilizing a short distance above the next lower sheet sufficient to allow cookies in the lower sheet to rise in normal fashion yet to leave very little excess distance between the top of each cookie and the bottom of the molds inset into the upper sheet. When inserted into a baking oven, the temperature of each set of molds is thus kept substantially the same, allowing for even baking of cookies in each sheet.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cookie sheet device which has all the advantages of the prior art devices and none of the disadvantages.

It is another object of the present invention to provide a new and improved cookie sheet device which may be easily and efficiently manufactured and marketed.

It is a further object of the present invention to provide a new and improved cookie sheet device which is of a durable and reliable construction.

An even further object of the present invention is to provide a new and improved cookie sheet device which is susceptible of a low cost of manufacture with regard to both materials and labor, and which accordingly is then susceptible of low prices of sale to the consuming public, thereby making such items economically available to the buying public.

Still another object of the present invention is to provide a new and improved cookie sheet device for simultaneously baking a large number of cookies.

Yet another object of the present invention is to provide a new and improved cookie sheet device having interchangeable and replaceable cookie molds positioned therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description

Figure 1:
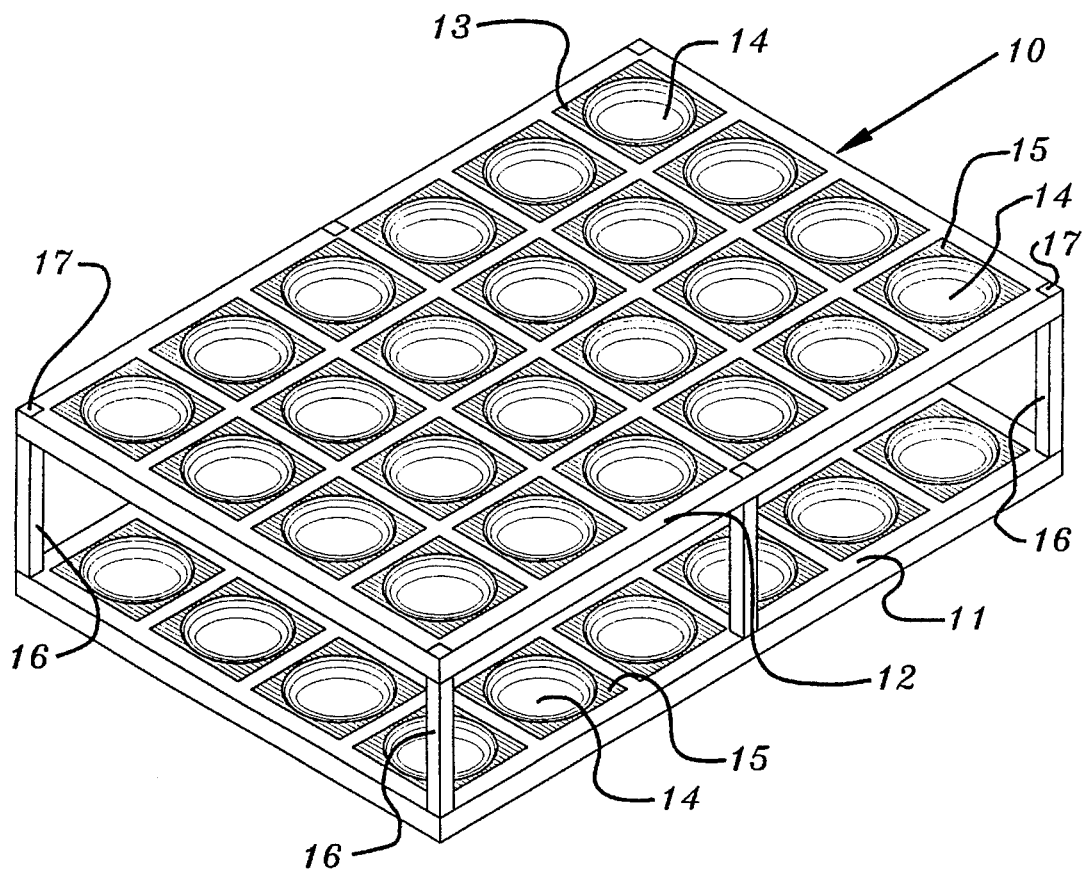

3 thereof. Such description makes reference to the annexed drawings wherein:

FIG. 1 is a perspective view of the device of the present invention.

Figure 2:
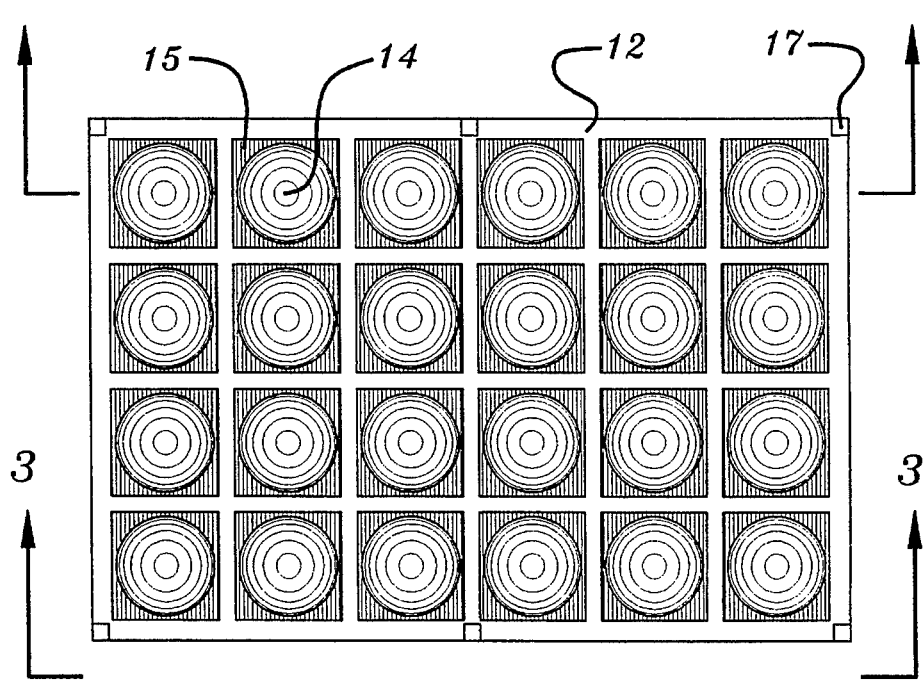

FIG. 2 is a top plan view of the device shown in FIG. 1.

Figure 3:
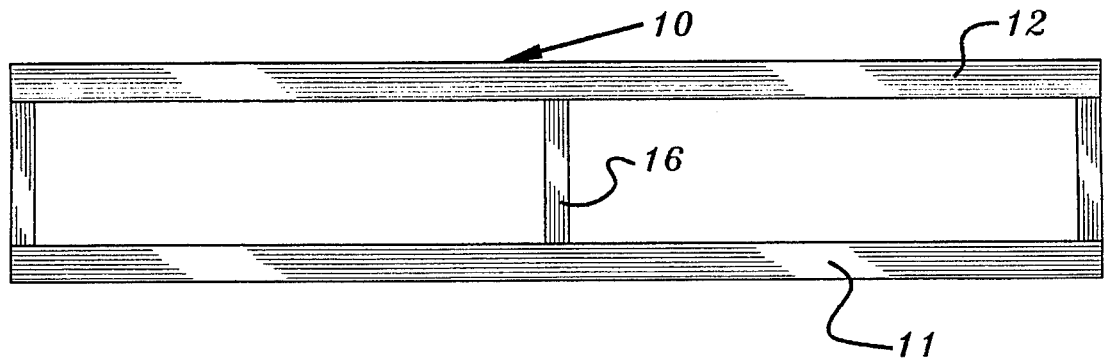

FIG. 3 is an end view taken on line 3—3 of the device of FIG. 2.

Figure 4:
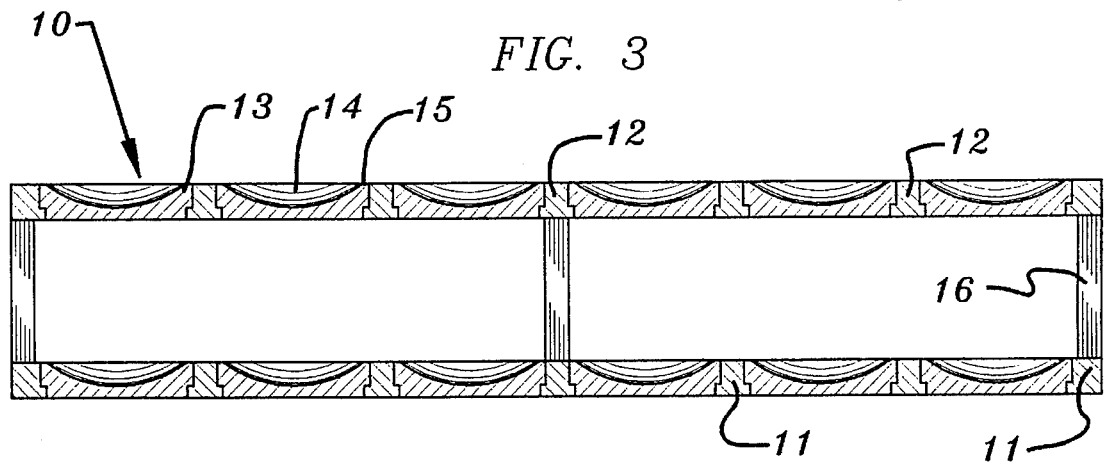

FIG. 4 is a sectional view taken on line 4—4 of FIG. 2.

Figure 5:
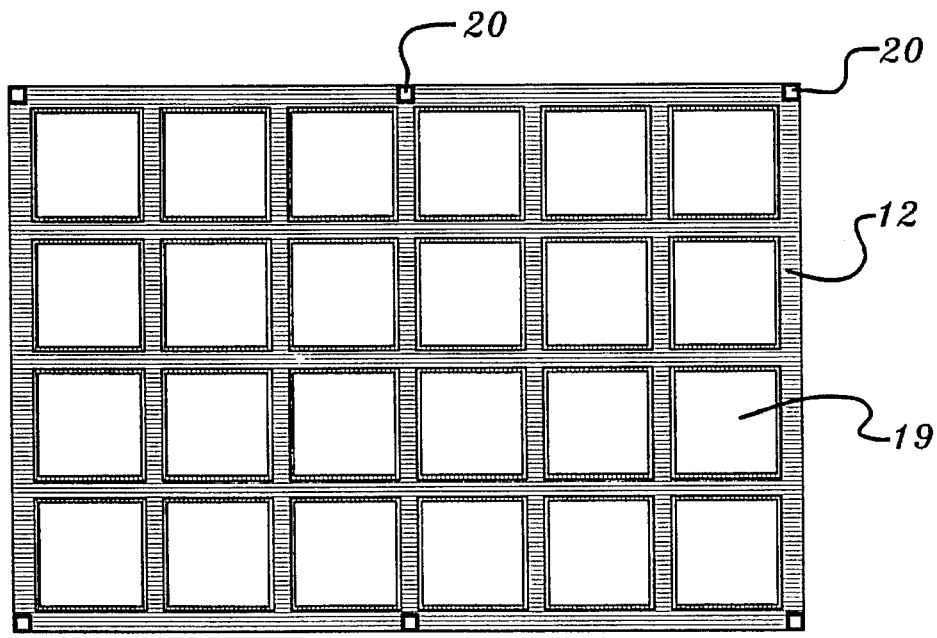

FIG. 5 is a similar view to that of FIG. 2 with the cookie molds removed.

Figure 6:
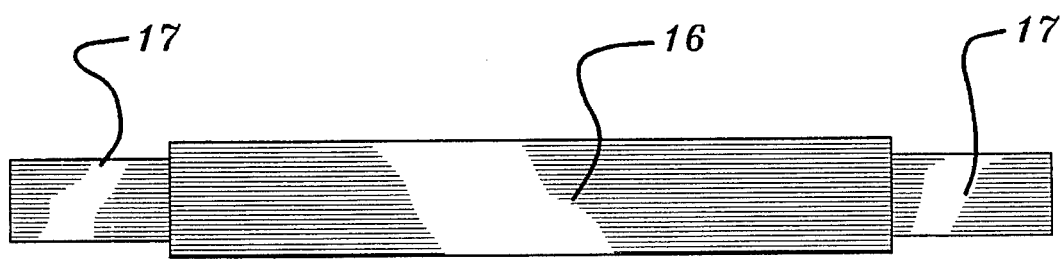

FIG. 6 is a side plan view of one of the heat conductive support members (here shown on its side to facilitate insertion onto the sheet of drawings).

Figure 7:
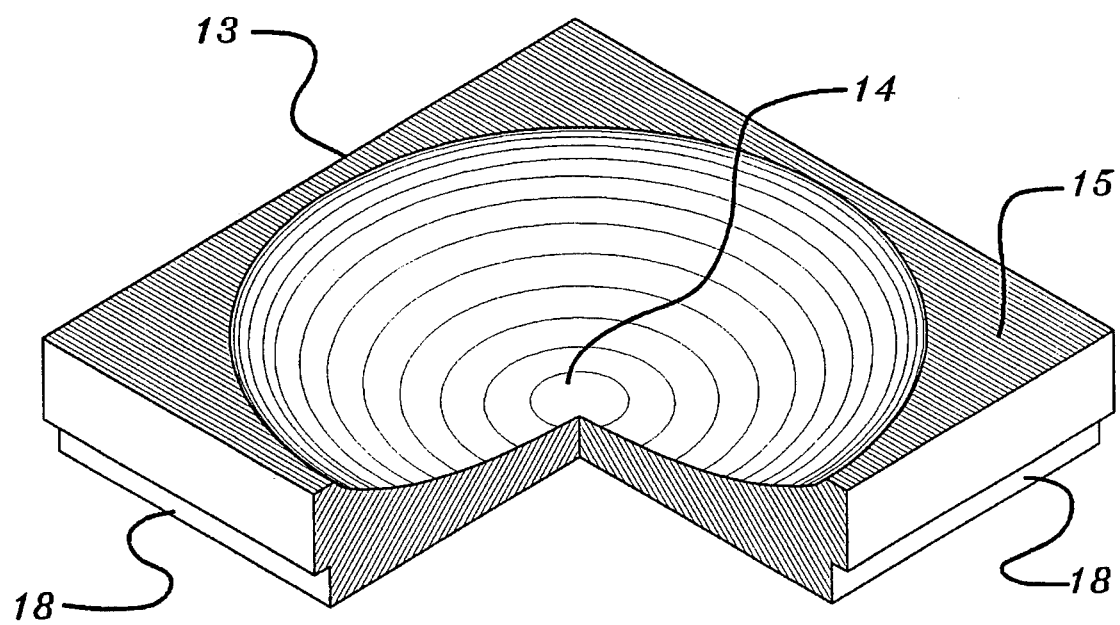

FIG. 7 is a partially-sectioned perspective view of one of the cookie molds of FIGS. 1 and 2.

FIG. 8 is a partial perspective view of a modification of the present invention.

FIG. 9 is a top plan view of an alternative mold configuration.

FIG. 10 is a top plan view of still another mold shape.

DESCRIPTION OF THE PREFERRED EMBODIMENT

With reference now to the drawings, and in particular to FIG. 1 and 2 thereof, a new and improved cookie sheet device embodying the principles and concepts of the present invention and generally designated by the reference numeral 10 will be described.

More specifically, it will be noted that the device 10 preferably comprises a pair of substantially rigid first and second cookie sheets 11 and 12 forming mold support members. Each sheet 11 and 12 contains a plurality of removable cookie mold units 13, such mold units being made up of a mold portion 14 and a surrounding frame 15. In this illustration of the device 10, the molds 14 are concave and circular in shape while the surrounding frame 15 is square. Circular frames and differently configured molds are also considered within the scope of the present invention. Molds 14 and associated frames 15 are positioned within openings in sheets 11 and 12 (as shown in subsequent drawings). The upper sheet 12 is positioned a short distance above the lower sheet 11–essentially just far enough for the cookies formed in the lower molds 14 to clear contact with such upper sheet 12. The distance is exaggerated in these drawings to permit showing device 10 more clearly. Sheet 12 is supported above sheet 11 by a plurality of vertical support members 16 each having reduced ends 17 fitting into corresponding openings (not shown) in sheets 11 and 12. Support members 16 are removable from sheets 11 and 12 to permit easy clean up of the device 10 after use. The support members 16 as well as the sheets 11 and 12 are made of heat conductive material, e.g., carbon steel, to insure as uniform heat distribution within the device 10 as possible.

FIGS. 3 and 4 show end views of the device 10 with 11 and 12 indicating the lower and upper sheets respectively and showing the vertical support members 16. FIG. 4 is a sectional view which illustrates that the mold frames 15 have an indent 18 around the base as more clearly shown in FIG. 7 below. As shown in FIG. 4, the cookie sheets 10 and 11 are each of a predetermined first vertical thickness, and the mold units 13 each are of a second vertical thickness. The first vertical thickness is substantially equal to the second vertical thickness such that the mold units reside flush with the upper and lower surfaces of a respective cookie sheet when the mold units are received within the cookie sheets, with no portion of the mold units projecting above the upper surface of the respective cookie sheet and no portion of the mold units projecting below the lower surface of the respective cookie sheet.

FIG. 5 shows sheet 12 separated from the device 10 and without its normally associated molds and the frames therefor. This permits showing the openings 19 in sheet 12 into which the mold frames 15 are inserted and also the tubular openings 20 in sheet 12 into which fit the reduced ends 17 of vertical support member 16.

FIG. 6 shows one of the vertical support members 16 with the reduced sections 17 at each end of such support member.

FIG. 7 is an enlarged view of one of the mold units 13 showing the mold 14 and its supporting frame 15. As mentioned above and shown much more clearly here, the frame 15 has an indent 18 extending completely around its base to provide an engagement between such frame 15 and the supporting sheet 11 or 12 as shown in FIG. 4.

FIG. 8 illustrates that, if desired, additional support members 16 may be used to provide more than two superposed sheets 13 and 14. With this configuration, each sheet 11, 12, 11–A, or 12–A as provided with an extension 21 of the receptacles 20 designed to seat the support members 16.

FIGS. 9 and 10 illustrate that the molds 14 may be of decorative configuration such as 22 and 23 in place of the round molds 14 previously illustrated.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A cookie sheet device comprising:

a rigid first cookie sheet having a plurality of mold openings directed therethrough;

a first plurality of mold units, each of the mold units being removably received and supported within an individual one of the openings of the first cookie sheet;

a rigid second cookie sheet having a plurality of mold openings directed therethrough, the second cookie sheet being positioned in a spaced and parallel orientation directly above the first cookie sheet such that the second cookie sheet coextensively covers the first cookie sheet;

a second plurality of mold units, each of the mold units being removably received and supported within an individual one of the openings of the second cookie sheet;

a plurality of vertical support members extending between the first and second cookie sheets, the vertical support members being removably coupled to the cookie sheets so as to removably support the second cookie sheet in the spaced and parallel orientation directly above the first cookie sheet;

wherein the cookie sheets are each of a predetermined first vertical thickness, with the mold units each being of a predetermined second vertical thickness, wherein the first vertical thickness is substantially equal to the second vertical thickness such that the mold units reside flush with upper and lower surfaces of the respective cookie sheet when received therein, with no portion of the mold units projecting above the upper surface of the respective cookie sheet and no portion of the mold units projecting below the lower surface of the respective cookie sheet.

2. The cookie sheet device of claim 1, wherein the cookie sheets each include four orthogonally oriented outer peripheral edges extending circumferentially thereabout and cooperating to define four orthogonally oriented corners of the respective cookie sheet, with the vertical support members extending between the cookie sheets at respective corners thereof such that the vertical support members are spaced from one another to define lateral openings extending between the cookie sheets and adjacent vertical support members along all four of the orthogonally oriented outer peripheral edges of the cookie sheets.

3. The cookie sheet device of claim 2, wherein the cookie sheets and the mold units are formed of a metallic material.

4. The cookie sheet device of claim 3, wherein the vertical support members are each shaped so as to define a first reduced end at a first end thereof, and a second reduced end at a second end thereof, and further wherein the first cookie sheet is shaped so as to define tubular openings directed into an upper surface thereof, and the second cookie sheet being shaped so as to define tubular openings directed into a lower surface thereof, with each of the first reduced ends of the vertical members being received within an individual one of the tubular openings of the first cookie sheet, and each of the second reduced ends of the vertical members being received within an individual one of the tubular openings of the second cookie sheet.

5. The cookie sheet device of claim 4, wherein the mold openings are substantially square in shape, and further wherein the mold units each comprise a surrounding frame having a substantially rectangular shape and defining an indent extending circumferentially about the surrounding frame, the indent abuttingly engaging a portion of the respective rigid sheet so as to support the surrounding frame within the respective mold opening of the respective rigid sheet.

6. The cookie sheet device of claim 5, wherein the mold units each further comprise a mold portion circumscribed by the surrounding frame.

7. The cookie sheet device of claim 6, wherein the mold openings in the first rigid sheet are arranged in a first matrix having a plurality of aligned rows and a plurality of aligned columns; and further wherein the mold openings in the second rigid sheet are arranged in a second matrix having a plurality of aligned rows and a plurality of aligned columns.

8. The cookie sheet device of claim 7, wherein the mold portion of each of the mold units is substantially concave and circular in shape.

* * * * *